(12) United States Patent
Ferguson et al.

(10) Patent No.: US 7,984,199 B2
(45) Date of Patent: Jul. 19, 2011

(54) CONFIGURATION OF FIELD DEVICES ON A NETWORK

(75) Inventors: Anthony Dean Ferguson, Watertown, MN (US); Donald Robert Lattimer, Chaska, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 172 days.

(21) Appl. No.: 12/074,653

(22) Filed: Mar. 5, 2008

(65) Prior Publication Data
US 2009/0228611 A1    Sep. 10, 2009

(51) Int. Cl.
*G06F 13/10* (2006.01)
*G06F 13/22* (2006.01)
*G06F 9/24* (2006.01)

(52) U.S. Cl. ............... 710/8; 710/10; 710/16; 709/220; 709/222

(58) Field of Classification Search .................. None
See application file for complete search history.

(56) References Cited

U.S. PATENT DOCUMENTS

| | | | |
|---|---|---|---|
| 6,014,612 A * | 1/2000 | Larson et al. .............. 702/183 |
| 6,032,203 A * | 2/2000 | Heidhues .................. 710/11 |
| 6,574,679 B1 * | 6/2003 | Chliwnyj et al. ............ 710/10 |
| 6,760,755 B1 * | 7/2004 | Brackett ................... 709/214 |
| 2003/0061384 A1 * | 3/2003 | Nakatani ................... 709/245 |
| 2003/0229686 A1 | 12/2003 | Kortright |
| 2007/0234339 A1 * | 10/2007 | Kostadinov ................ 717/171 |
| 2007/0250180 A1 * | 10/2007 | Bump et al. ............... 700/1 |
| 2008/0005550 A1 * | 1/2008 | Ichtertz ..................... 713/1 |
| 2008/0130517 A1 * | 6/2008 | Lee et al. ................... 370/254 |
| 2008/0228957 A1 * | 9/2008 | Meyer et al. ............... 710/19 |

OTHER PUBLICATIONS

International Search Report and Written Opinion of the International Searching Authority in counterpart foreign Application No. PCT/US 09/01143 filed Feb. 24, 2009.

* cited by examiner

*Primary Examiner* — Ilwoo Park
(74) *Attorney, Agent, or Firm* — Kinney & Lange, P.A.

(57) ABSTRACT

Field devices on a communication network can be configured using a configuration device that stores a configuration data for each of the field devices in a network configuration domain in nonvolatile memory. Each field device includes a configuration domain associated with configuration data stored in nonvolatile memory of the field device. In response to commands from the configuration device, the field devices upload configuration data to or download configuration data from the configuration device. Field devices receive configuration data from the configuration device and store the received configuration data in the nonvolatile memory to define the configuration of the field device.

7 Claims, 6 Drawing Sheets

CONFIGURATION OF FIELD DEVICES ON A NETWORK

BACKGROUND

The present invention relates to the configuration of field devices of process control and monitoring systems. In particular, the present invention relates to configuration of field devices in a digital communication network.

In a typical industrial plant, a process control/monitoring system is used to control many of the industrial processes performed at the plant. Typically, the plant has a centralized control room having a computer system with user input/output (I/O), disc I/O, and other peripherals as are known in the computing art. Coupled to the computing system are a controller and a process I/O subsystem.

The process I/O subsystem includes I/O ports which are connected to various field devices throughout the plant. Field devices include various types of analytical equipment, silicon pressure sensors, capacitive pressure sensors, resistive temperature detectors, thermocouples, strain gauges, limit switches, on/off switches, flow transmitters, pressure transmitters, capacitance level switches, weigh scales, transducers, valve positioners, valve controllers, actuators, solenoids, and indicator lights. The term "field device" encompasses these devices, as well as any other device that performs a function in a process control/monitoring system.

Traditionally, analog field devices have been connected to the control room by two-wire twisted pair current loops, with each device connected to the control room by a single two-wire twisted pair. Analog field devices are capable of responding to or transmitting an electrical signal within a specified range. In a typical system, it is common to have a voltage differential of approximately 20-25 volts between the two wires of the pair and a current of 4-20 milliamps running through the loop. An analog field device that transmits a signal to the control room modulates the current running through the current loop, with the current proportional to the sensed process variable. On the other hand, an analog field device that performs an action under control of the control room is controlled by the magnitude of the current through the loop, which is modulated by the I/O port of the process I/O system, which in turn is controlled by the controller.

More recently, hybrid systems that superimpose digital data on the current loop have been used in process control systems. One hybrid system known in the control art as the Highway Addressable Remote Transducer (HART) system uses the magnitude of the current in the current loop to sense a process variable (as in the traditional system), but also superimposes a digital carrier signal upon the current loop signal. The carrier signal is relatively slow, and can provide updates of a secondary process variable at a rate of approximately 2-3 updates per second. Generally, the digital carrier signal is used to send secondary and diagnostic information and is not used to realize the primary control function of the field device. Examples of information provided over the carrier signal include secondary process variables, diagnostic information (including sensor diagnostics, device diagnostics, wiring diagnostics, and process diagnostics), operating temperatures, temperature of the sensor, calibration information, device ID numbers, materials of construction, configuration or programming information, etc. Accordingly, a single hybrid field device may have a variety of input and output variables and may implement a variety of functions.

Fieldbus is a multi-drop serial digital two-way communications protocol defined by the Instrument Society of America (ISA). Fieldbus is intended for connecting field instruments and other process devices such as monitoring and simulation units in distributed control systems. Fieldbus allows enhanced digital communication over previous process control loop methods while maintaining the ability to power process devices coupled to the Fieldbus loop and while meeting intrinsic safety requirements.

Two reasonably standardized industrial Fieldbus protocols are Foundation Fieldbus and Profibus. The physical layer of the Fieldbus protocols are defined by Instrument Society of America standard ISA-S50.02-1992, and its draft two extension dated 1995. The Fieldbus protocol defines two subprotocols. An H1 Fieldbus network transmits data at a rate up to 31.25 kilobits per second (Kbps) and provides power to field devices coupled to the network. The H1 physical layer subprotocol is defined in Clause 11 of the ISA standard, part two approved in September 1992. An H2 Fieldbus network transmits data at a rate up to 2.5 megabits per second (Mbps), does not provide power to field devices connected to the network, and is provided with redundant transmission medium.

Foundation Fieldbus allows each field device in the network to be configured. Configuration data is stored in non-volatile memory within the field device, and is used to define the function characteristics of the field device on the network. This configurability of field devices allows a Foundation Fieldbus network to be used in a wide array of different applications. On the other hand, configuration of a Foundation Fieldbus field device can be complex, and requires substantial skill and experience by the individual performing the configuration. Often, this requires that the person configuring the field device be a control systems engineer.

In addition, maintenance can be more complex because it is not possible to simply remove one field device from the Foundation Fieldbus network and replace it with another field device. Instead, field devices must be recommissioned as well as reconfigured every time a field device is replaced. Replacing a Foundation Fieldbus field device requires operation of the host computer, which includes a configuration tool in software. The host stores data relating to the configuration of the device to be replaced in its database. The device is then decommissioned and replaced with a new device. The new device is then commissioned and is configured with the stored configuration data from the host. The user must then run device specific methods at the host to configure miscellaneous features of the field device that has been installed.

Configuration by the host involves sending a sequence of individual messages to each field device in order to configure every function block and every transducer block. There may be, for example, up to 5 transducer blocks and 13 function blocks requiring configuration. This configuration process must be performed from the host (which has the configuration tool software), rather than at the location where the field device is installed.

SUMMARY

The present invention provides an improved method of configuring field devices on a digital communication network, such as a Foundation Fieldbus network. Each field device includes a configuration domain in memory associated with nonvolatile memory in which configuration data for the field device is stored. This configuration domain allows a block of configuration data representing a configuration of the entire field device or a portion of the field device configuration (e.g. a Foundation Fieldbus function block) to be uploaded from the field device to a configuration device, and for a block of configuration data to be downloaded from the configuration device to the field device.

In one embodiment, field devices are configured by uploading to a configuration device a block of data representing a device configuration for each of a plurality of field device types. The configurations are stored in a network configuration domain of the configuration device. The configuration device can then be used to download to a new field device on the network one of the stored configurations if that new device is one of a plurality of field device types represented in the network configuration domain.

In another embodiment, the replacement of field devices on a network is provided by storing in an configuration device a complete configuration for each existing field device on the network. The configuration device detects when an existing field device drops off of the network, and detects when a replacement field device is added to the network. When a replacement field device is detected, the configuration device configures the replacement field device by downloading the complete configuration data of the device that has been replaced.

DETAILED DESCRIPTION

Figure 1:
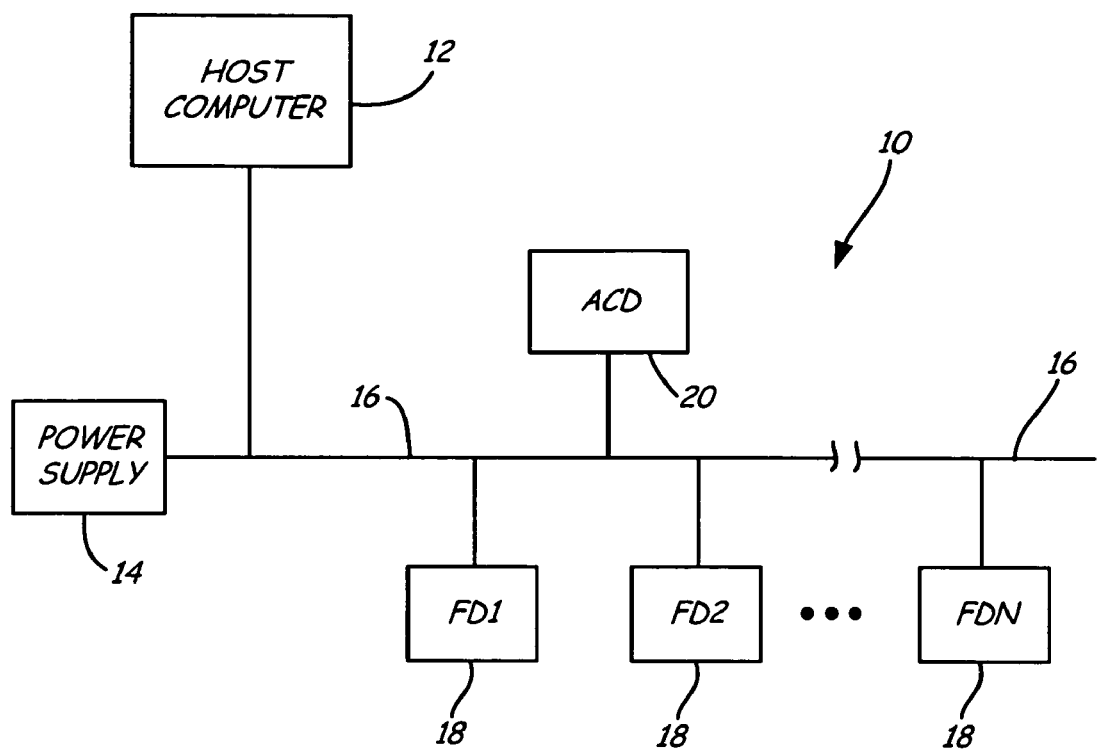
FIG. 1 is a diagram showing a digital communication network including a host computer, field devices, and a configuration device.

FIG. 1 shows network 10, which includes host computer 12, power supply 14, communication bus 16, field devices 18 (which are designated as device FD1, FD2 . . . FDN), and a configuration device such as auto-configuration device (ACD) 20. Network 10 will be described in the context of a process control/monitoring system using Foundation Fieldbus communications protocol with communication of messages over bus 16, although the invention has general applicability to digital networks having field devices that require configuration.

Host computer 12 and power supply 14 are typically located within a centralized control room in an industrial process plant. Bus 16 may be, for example, a two wire twisted pair or a four wire cable that supplies power from power supply 14 to field devices 18, and provides a communication pathway over which messages can be sent. Bus 16 may support, for example, up to 32 devices on a single cable, although typically the number of devices on bus 16 may range from about 4 to about 16 devices, based on loop execution speed, power, and intrinsic safety requirements.

Typically, host computer 12 will act as a link active scheduler (LAS) of network 10. In its function as the LAS device, host computer 12 maintains a central schedule for all communication between devices on bus 16.

At least one of the other devices in network 10 is configured to act as a link master (LM) device. An LM device is configured to take over the responsibility of the LAS device should the LAS device fail or become inoperable. More than one LM device can be present on bus 16. This allows for the case if both the LAS device and the first LM were to fail, then a second LM device can take over the link active scheduler functions. In this example, auto-configuration device 20 and field device FD1 have link master capabilities.

Field devices 18 can be process instruments that sense one or more process parameters and provide data based upon the sensed parameters. Field devices 18 can also be process actuators, which provide a physical output based upon a command message received over bus 16. In some cases, a field device can include both sensing and actuating capabilities. Each field device 18 includes nonvolatile memory for storing configuration data that defines the functionality and operating parameters of that field device within network 10.

Auto-configuration device (ACD) 20 is typically a portable or handheld device that can be attached and detached from bus 16 at various locations. In other embodiments, the functionality of ACD 20 is incorporated into one of field devices 18, or into host computer 12. ACD 20 can be used during the installation and commissioning of field devices 18, as well as during the removal and replacement of one of the field devices 18. In addition, ACD 20 can be used to change or upgrade configurations of field devices 18 in the network 10.

Figure 2:
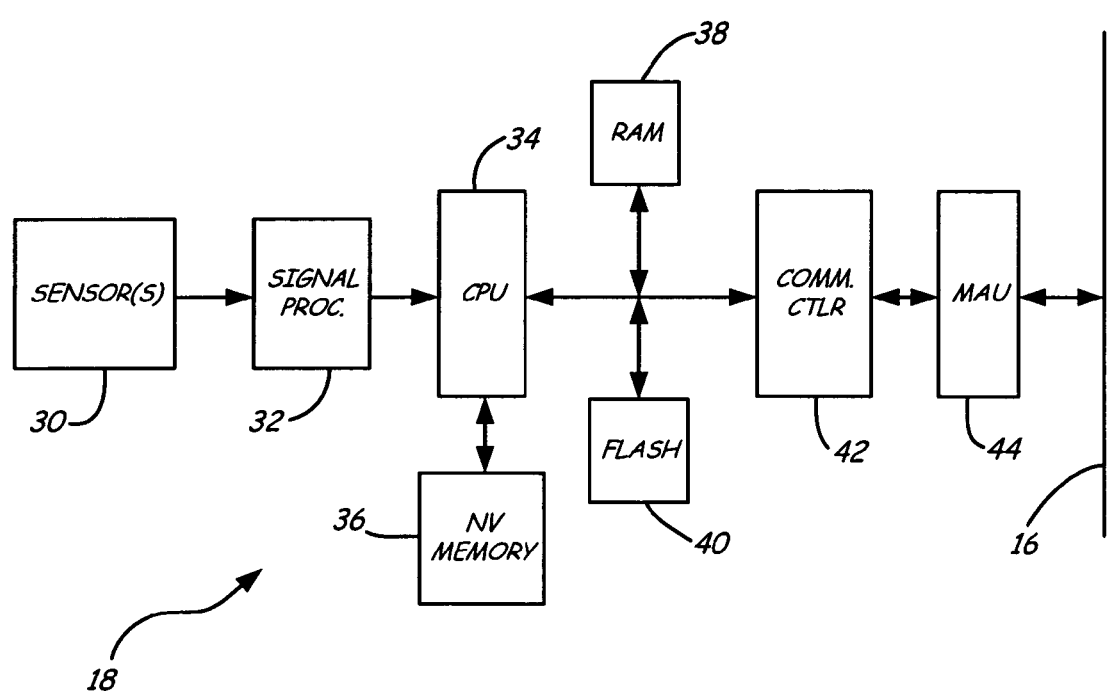
FIG. 2 is a block diagram of a field device.

FIG. 2 shows a block diagram of a typical field device 18. In this particular example, field device 18 is a process instrument or transmitter that senses a process parameter, (such as temperature, pressure, flow, or level) and produces output data representing the parameter that has been sensed.

Field device 18 shown in FIG. 2 includes sensor(s) 30, signal processing circuitry 32, central processing unit (CPU) 34, nonvolatile memory 36, random access memory (RAM) 38, flash memory 40, communications controller 42, and medium attachment unit 44.

Sensors 30 sense one or more process parameters or variables and provide sensor signals to signal processing circuitry 32. The sensor signals may include a primary variable (e.g. pressure) and a secondary variable (e.g. temperature). The secondary variable may be used by CPU 34 for correction or compensation of the sensor signal representing the primary variable.

Signal processing circuitry 32 typically includes analog-to-digital conversion circuitry, as well as filtering and other signal processing to place the sensor signals into a format that can be used by CPU 34. For example, signal processing circuitry 32 may include one or more sigma delta analog-to-digital converters and digital filters to provide digitized and filtered sensor signals to CPU 34.

CPU 34 coordinates the operation of field device 18. It processes data received over bus 16; it receives and stores sensor signals generated by sensor 30 and signal processing circuitry 32; and it creates and selects data to be contained in messages that will be transmitted from field device 18 over bus 16. CPU 34 is typically a microprocessor with associated memory, such as nonvolatile memory 36, random access memory 38, and flash memory 40.

Nonvolatile memory 36 stores application programming used by CPU 34. In addition, nonvolatile memory 36 obtains stored configuration data for field device 18, calibration data, and other information required by CPU 34 to control the operation of field device 18. In one embodiment, nonvolatile memory 36 includes EEPROM storage for all of the configuration data of field device 18. That configuration data is uploaded to field device 18 from ACD 20 during a configuration process, and can be downloaded from field device 18 to ACD 20, so that ACD 20 has a configuration of field device 18.

Nonvolatile memory 36 includes several domains, which are partitions of memory used to hold either data (a data domain), or a program (an executable domain). In addition to the data and executable domains, field device 18 also includes a configuration domain. The portion of nonvolatile memory 36 that holds configuration data is associated with the configuration domain, so that an entire device configuration can be uploaded or downloaded using the configuration domain.

The use of a configuration domain greatly simplifies the configuration process. An entire configuration of field device 18 can be downloaded as a block of data to ACD 20, so that ACD 20 can contain complete configuration for each of the field devices on network 10. It also allows ACD 20 to configure a new or replacement field device by uploading the entire configuration as a block (or blocks) of data to the configuration domain of the field device. This avoids having to send out a sequence of messages with individual configuration parameters to each field device in order to configure every function block and every transducer block of the field device.

Communication controller 42 serves as an interface between CPU 34 and MAU 44. Communication controller 42, which may be an application specific integrated circuit receives data from MAU, decodes the data, forms data into bytes, and provides message data to be read by CPU 34. The data transmission, communication controller 42 receives bytes of data from CPU 34, and formats the data into messages, provides messages to MAU 44 for transmission on bus 16.

MAU 44 provides the network connection of field device 18 to bus 16. MAU 44 may be an integrated circuit or discrete components.

Figure 3:
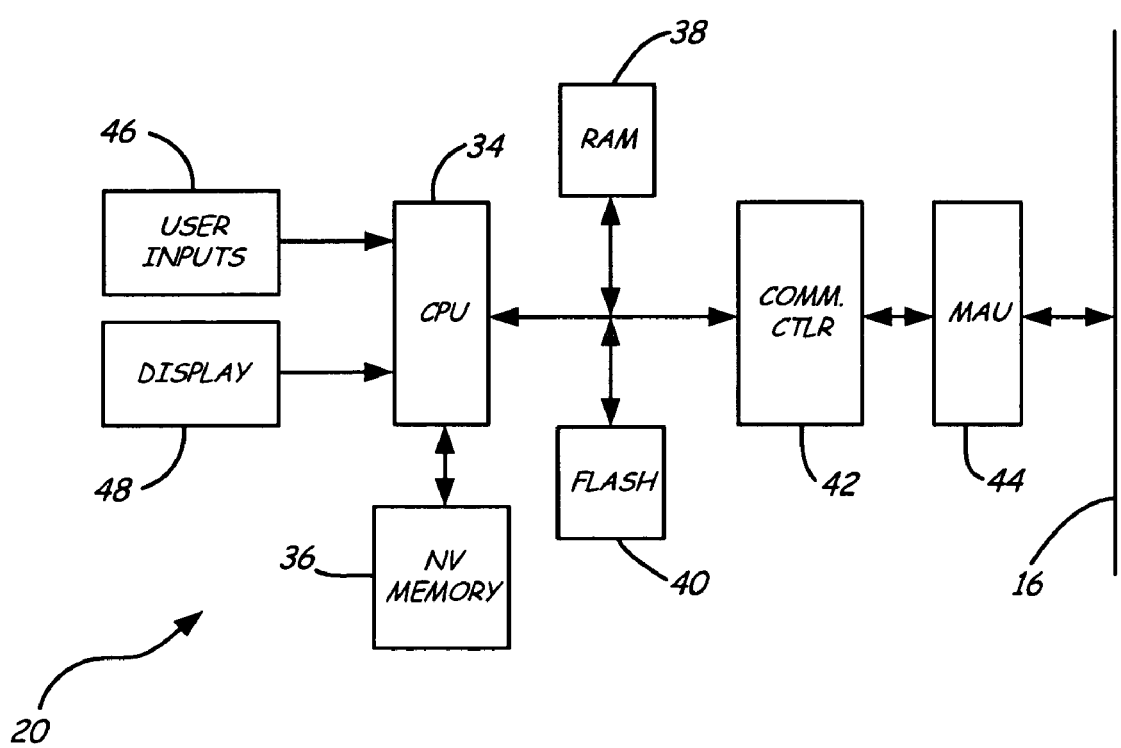
FIG. 3 is a block diagram of a configuration device.

FIG. 3 is a block diagram of auto-configuration device (ACD) 20. The overall architecture of ACD 20 is similar to field device 18 and includes CPU 34, nonvolatile memory 36, RAM 38, flash memory 40, communications controller 42, and MAU 44. ACD 20 also includes a user interface formed by user inputs 46 and display 48. User inputs 46 may be one or more switches, or a set of input keys, or similar input devices. Display 48 may be a liquid crystal display, one or more light emitting diodes, or other indicator or display elements.

ACD 20 includes an imbedded software application stored in nonvolatile memory 36 that is capable of uploading and storing configurations for multiple field devices (e.g. up to 16 field devices) when requested. The software application also is capable of configuring a new field device using a stored configuration, if that new device has the same device type as one of the stored device configurations. The software application also is capable of detecting when an existing device drops off of network 10, which is particularly useful when ACD 20 is permanently installed on network 10. When a replacement device is added to the network, the software application allows ACD 20 to automatically configure replacement device with no user interaction. The configuration process occurs through downloading of a stored device configuration to the configuration domain of the replacement device.

ACD 20 stores device configuration data in configuration domains within nonvolatile memory 36. Because ACD 20 is capable of storing configuration data for multiple devices, nonvolatile memory 36 must be sized appropriately to accommodate the number of configuration domains.

ACD may include a domain that holds the entire network configuration. This feature can be used to upload an entire network configuration from ACD 20 to a file. The file can then be sent to another user, who downloads the contents of the file to another ACD. This can be used to clone network configuration.

Figure 4:
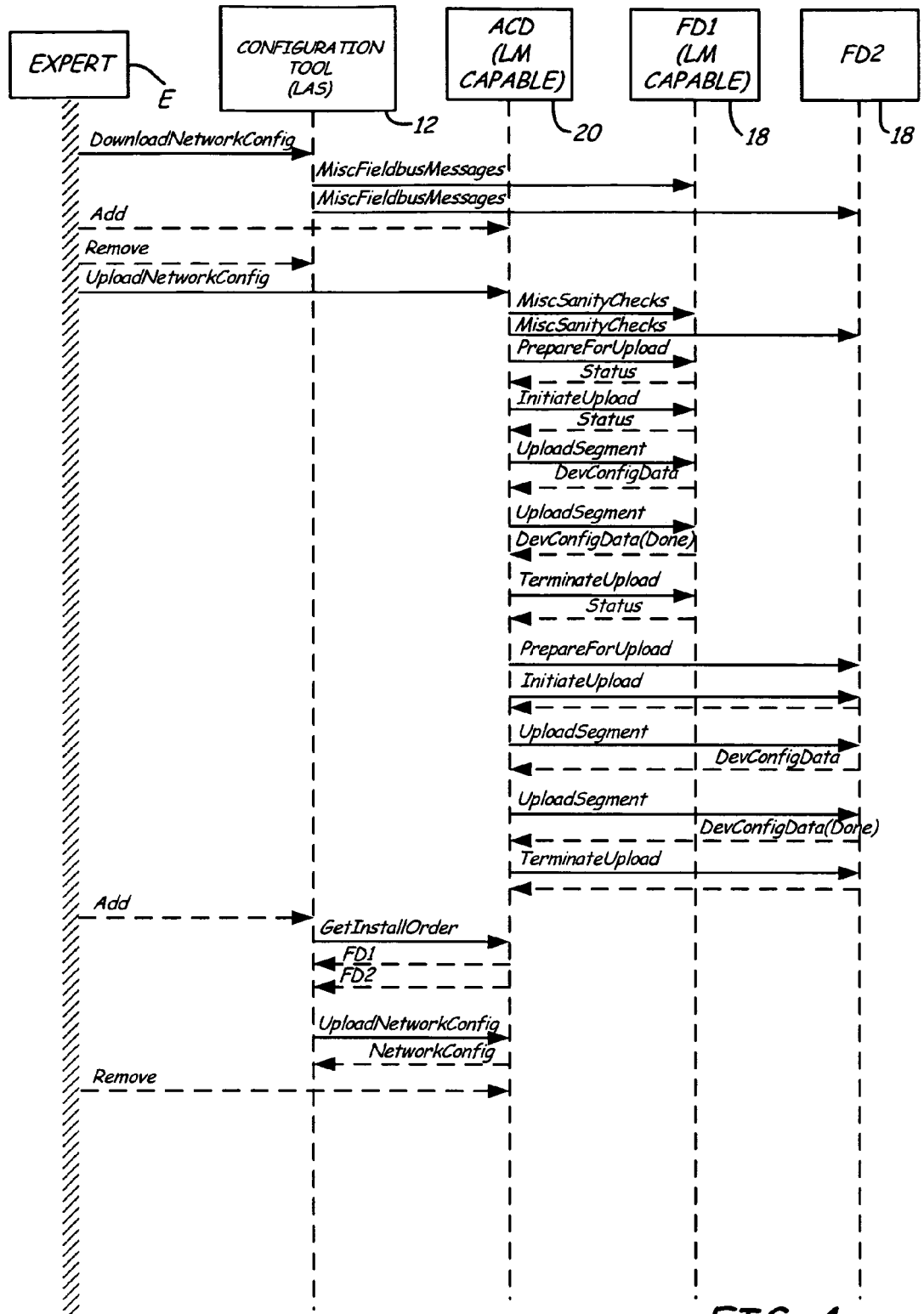
FIG. 4 is a sequence diagram illustrating uploading of configuration data from two devices of a reference solution to a configuration device.
Figure 5:
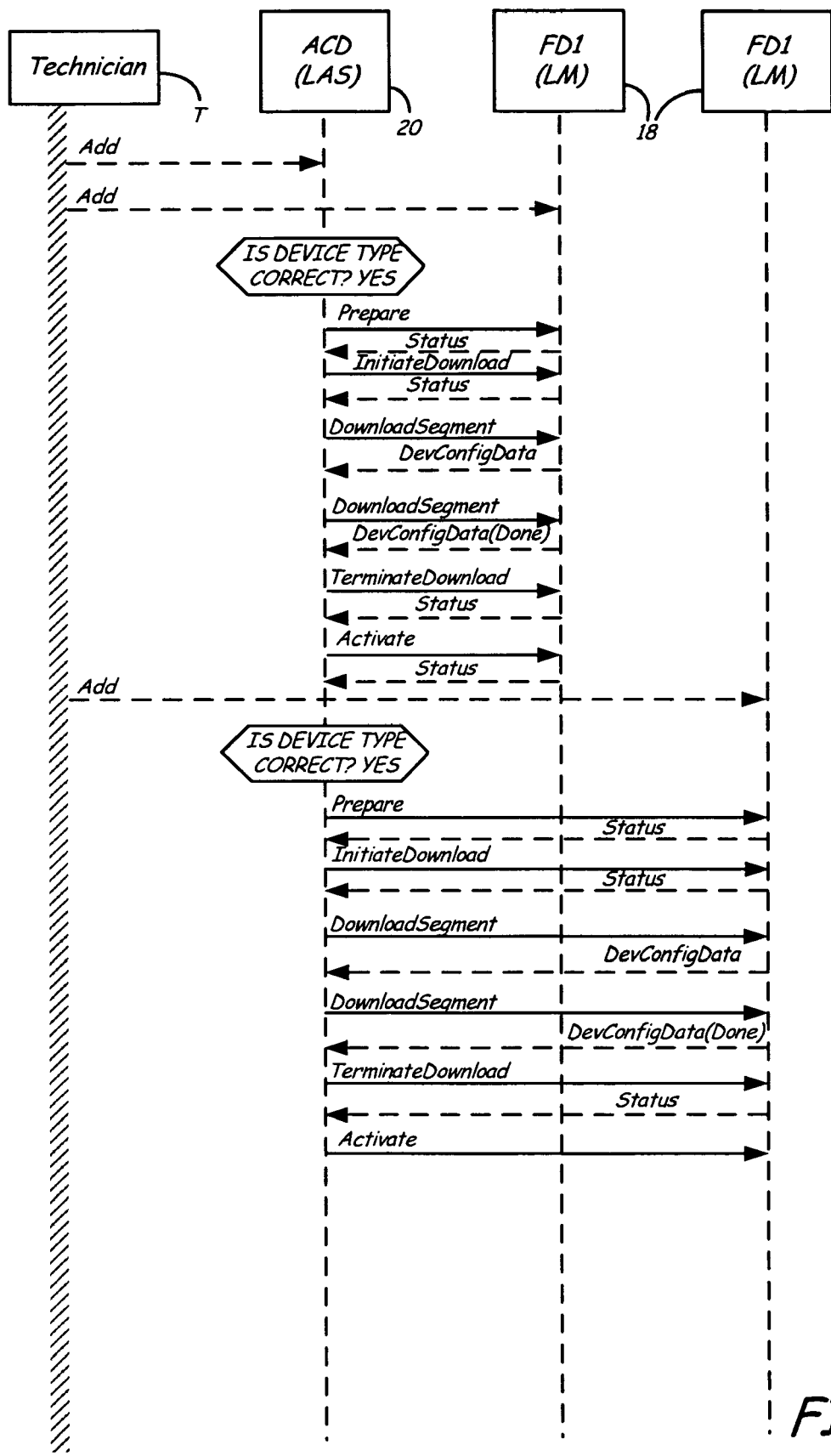
FIG. 5 is a sequence diagram showing the use of the configuration device to download configuration data to two devices in a remote field installation.
Figure 6:
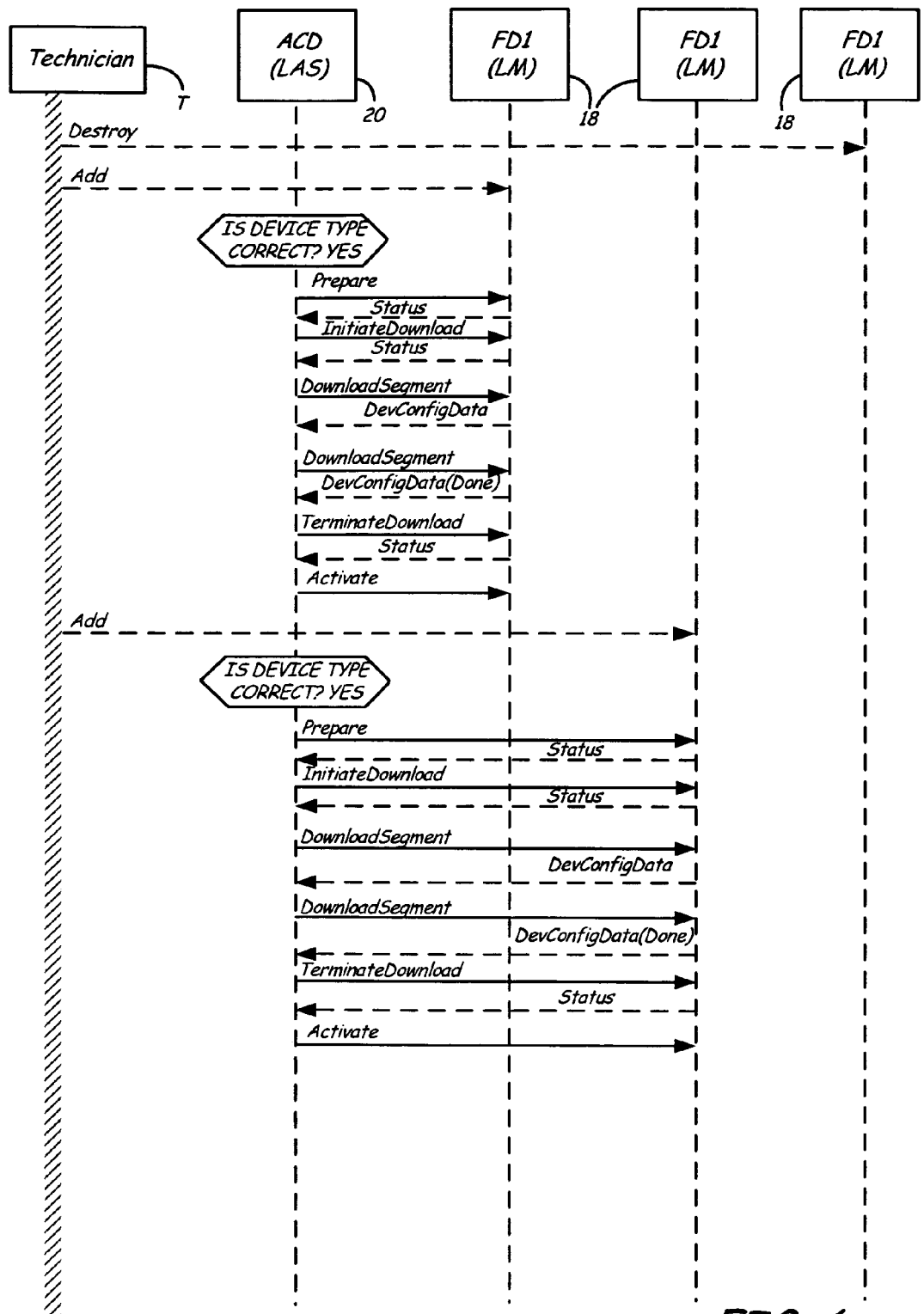
FIG. 6 is a sequence diagram illustrating removal of a device and the replacement with a new device, using the configuration device.

FIGS. 4-6 are sequence diagrams illustrating different operations performed using ACD 20. FIG. 4 shows an example of uploading blocks of configuration data representing device configurations (as opposed to individual configuration parameters) to ACD 20. In this example, expert E is a control systems engineer or other technical person that is familiar with Foundation Fieldbus and with the techniques for configuring the various function blocks and transducer blocks within field devices in order to configure them. In this example, expert E has created reference solution or design involving two field devices FD1 and FD2. Expert E uses configuration tool software 50 running on host computer 12 to initially configure devices FD1 and FD2. Host computer 12, with configuration tool software 50, acts as the link active scheduler (LAS) in the network that includes the host computer 12 and field devices, FD1 and FD2.

Initially, expert E provides a download network configuration command to configuration tool 50. The configuration data for the various function blocks and transducer blocks FD1 is then provided through a series of Foundation Fieldbus messages. When all of the configuration data for FD1 has been downloaded, configuration tool 50 then sends a similar series of Foundation Fieldbus messages to device FD2.

Once devices FD1 and FD2 have been configured, expert E powers on ACD 20 to add it to the network, and removes host computer 12 from the network. Expert E then sends an upload network configuration command to ACD 20. This commands ACD 20 to cause each device on the network to upload configuration data stored in the device's configuration domain to ACD 20. Host computer 12 is removed from the network before network configuration is uploaded, so that ACD 20 does not receive an upload of all configuration data that host computer 12 has stored. The data from host computer 12 would be duplicative, at least in part, of the configuration data uploaded to ACD 20 by the individual field devices.

In the example shown in FIG. 4, both ACD 20 and field device FD1 are indicated as being link master (LM) capable. With host computer 12 removed from the network, one of these link master capable devices will assume the role of link active scheduler within the network.

Before uploading configuration data from field devices FD1 and FD2, ACD 20 first performs a series of sanity checks with each device. The sanity checks are required to detect misconfiguration that could lead to a failed uploading of data to ACD 20. For example, if two link master devices on the network have different network settings, ACD 20 could be unable to complete uploading of device configurations.

Once the sanity checks have been satisfied, ACD 20 provides a Prepare for Upload command to device FD1. This command instructs device FD1 to copy information from the configuration domain of nonvolatile memory 36 to a buffer within RAM 38 of device FD1. Device FD1 responds with a status message to ACD 20.

ACD 20 then provides an Initiate Upload command to FD1 and receives a status response. ACD 20 then provides a series of Upload Segment commands, to which device FD1 responds messages containing segments of the device configuration data from the configuration domain stored in device FD1. When the last segment of the device configuration data has been transmitted, device FD1 will indicate that uploading of device configuration data is done. ACD 20 will then send a Terminate Upload command, and device FD1 will respond with a status message.

ACD 20 then repeats the upload process with device FD2, until all device configuration data from the configuration domain of device FD2 has been uploaded to ACD 20. The configuration data from each device FD1 and FD2 will be stored by ACD 20 in a network configuration domain of nonvolatile memory of ACD 20. If the network contains more than two devices, the process will continue until all devices on the network have uploaded configuration data to ACD 20. At that point, ACD 20 has a complete configuration of the network stored in the network configuration domain of its nonvolatile memory 36.

As a result, ACD 20 contains, in essence, a library of configurations used for devices on network 10. Each device configuration will be stored by device type and device tag. The device tag allows for multiple devices of the same device type to exist on the network, while allowing the user to distinguish between those devices and provide different configurations if desired.

Once ACD 20 has completed the upload process, host computer 12 (with configuration tool 50) can be added to the network. Configuration tool 50 can then provide a command to ACD 20 to get the order in which configuration data was uploaded from devices FD1 and FD2 to ACD 20. The order of installation is provided in a return message by ACD 20 to configuration tool 50. If desired, host computer 12 can then provide a command to ACD 20 to upload the network configuration stored by ACD 20 in its network configuration domain. In that way, host computer 12 can store a complete copy of the network configuration, just as it is stored in ACD 20. The copy of the network configuration can be stored as a file on host computer 12, sent as a file attachment in an email, or copied to a storage medium such as a CD or flash drive.

Finally, expert E powers off ACD 20 to remove it from the network. ACD 20 can then be physically disconnected from the network and handed off to a technician along with instructions as to where to install the field devices and the order of installation.

The process shown in FIG. 4 can be performed, for example, in a laboratory at the site where a network, a host computer, and field devices like the ones to be installed in the industrial plant are available to model the system. In that case, host computer 12 may be the host that is or will be used at the site.

Alternatively, the ability to upload complete device configurations and store them in ACD 20 allows the network expert E to perform the configuration and uploading to ACD 20 at another site. For example, expert E may be an independent consultant who has designed the network. By storing configuration data for all of the devices on the network, the installation process can be performed on a site that is different than the location of the network expert. FIG. 5 illustrates an example of an installation at a remote field location in which technician T using ACD 20 can install and configure each field device, without the need of a host computer having configuration software.

In the example shown in FIG. 5, technician T installs field devices FD1 and FD2 in a remote field installation and configures them using ACD 20. ACD 20 may be a permanent device located on the network, or may be a temporary or handheld device. In either case, it is a link master that assumes the link active scheduler function in the absence of a host computer on the network. Technician T provides an add command to ACD 20. The other devices on the network will then be powered up in the order required by ACD 20. The order of devices may be indicated to technician T through display 48 of ACD 20. Throughout the entire process, ACD 20 continues as the link active scheduler.

As shown in FIG. 5, technician T first powers up device FD1. If this is the correct device type, then ACD 20 sends a command to device FD1 to Prepare for Download, and device FD1 responds with a status message. ACD 20 then sends an Initiate Download command, followed by a series of Download Segment commands until all of the device configuration data stored in the network configuration domain of ACD 20 for that particular device has been downloaded. Upon receiving a message from device FD1 that the downloading of device configuration data is done, ACD 20 then sends a Terminate Download command. Finally, ACD 20 provides an Activate command to device FD1, causing device FD1 to become active on the network, using the configuration data that has been downloaded.

Technician T then adds device FD2 to the network, and the same process is repeated until device FD2 receives an activate command from ACD 20. This process will continue until all devices on the network have been added. At that time, ACD 20 may be removed if it is a temporary or portable handheld device.

FIG. 6 shows an example in which technician T removes an old field device FD1 and replaces it with a new device FD1a. ACD 20 may still have stored the entire network configuration in the network configuration domain of its nonvolatile memory. If it does, then the process shown in FIG. 6 can begin with technician T destroying (removing) original device FD1 from the network. If ACD 20 does not include the network configuration for the particular network, then it first goes through a process of uploading configuration data from each device that is on the network, using an upload procedure like the one illustrated in FIG. 4.

ACD 20 is powered up first, and then other devices are powered up in order. If device tags for the field devices are preconfigured, the field devices are powered up in any order. If device tags are not preconfigured, then the field devices are powered up in an order previously specified by expert E. During the entire process, ACD 20 acts as the link active scheduler.

ACD 20 determines whether new device FD1 is the correct device type. If so, ACD 20 proceeds through a download process similar to the one described in FIG. 5. This includes Prepare for Download, Initiate Download, Download Segment, Terminate Download, and Activate commands from ACD 20 to new device FD1a.

At that point, new device FD1a has replaced original device FD1, and has the same configuration as the device it replaced. That is because the configuration of the original device was stored in the network configuration domain of ACD 20, and was downloaded to the new device FD1a before that device was activated.

ACD 20 then continues the process with each additional device on the network. The configuration for each device on the network is downloaded, even if the device was originally on the network, and the configuration that is downloaded is the same as the previous configuration. When the process is completed, every device in the network, including the replacement device FD1a, has received a download of configuration data.

In another example, exchanging or updating system solutions can be performed. In this example, an expert consultant at a remote site has created a solution and has uploaded that solution to an ACD using the procedure shown in FIG. 4. The network configuration data, as stored by the ACD, is then uploaded to the host computer, and a file containing the entire network configuration is stored. The remote expert then emails the network configuration data as a file to a local network expert.

The local expert uses configuration tools in host computer 12 to download the configuration data to ACD 20 using the domain download services available in host computer 12. ACD 20 is then placed on the network, and a network configuration takes place, as illustrated in FIG. 5.

This technique can be useful, for example, when a manufacturer of a field device decides to obsolete a particular device revision. A user having a network that includes that type of device can send a network configuration to the manufacturer. The manufacturer can then modify the network configuration with the latest revision of the obsoleted device. The new network configuration can then be emailed back to the user or accessed through an internet server. Through the use of ACD 20, which receives an upload of the network configuration from the host computer, the new network configuration can then be downloaded to the network at the user's facility. ACD 20 will automatically reconfigure the entire network when the process is complete.

ACD 20 can also be used to install new configurations that represent device enhancements. During the process of downloading a new configuration to a field device that is on the network, the field device may save a copy of the existing device configuration. When download of the new configuration data from ACD 20 has been completed, ACD 20 may provide an Activate command that instructs the device to swap from the previously stored configuration to the newly stored configuration data. The field device will copy the new configuration data into the configuration domain of nonvolatile memory 36. The previously stored configuration data may be transferred to another nonvolatile memory location or domain.

Subsequently, the configuration of the field device may be changed back to the prior configuration through the use of ACD 20. In that case, ACD 20 will provide a message commanding the device to revert to the previous configuration. The two sets of configuration data will be exchanged, so that the configuration domain contains the configuration data that then is actively being used by the field device.

Still another use of ACD 20 and the network configuration domain is for trouble-shooting problems encountered with a network. A user can provide the complete network configuration to a remote expert or the equipment manufacturer, by using ACD 20 to upload its network configuration domain. A file containing the network configuration can be sent to the remote expert or manufacturer so that an exact replica of the network can be configured and tested.

Although ACD 20 has been described in the context of a portable or handheld device that can be used by a technician in the field while installing, removing, or replacing field devices, the configuration functionality also can be built into one of the field devices that is installed on the network. To accommodate the configuration functionality, the field device may require expanded memory in order to store the network configuration domain, as well as the embedded application software for performing the configuration functions. Another alternative is to incorporate the configuration device functionality into host computer 12.

The configuration function is made possible by using nonvolatile memory 36 to store device configuration data in a special configuration domain. By having all configuration data associated with a domain, the general domain transfer capabilities of the Foundation Fieldbus protocol (or similar protocols) facilitate uploading and downloading of configuration data as a file. As a result, field devices can be installed and replaced in the field without requiring detailed knowledge by the installer (i.e. a technician) of the intricacies of either the field device or the host computer.

By use of a device like ACD 20, the need for configuration tools running on software in a host computer can be eliminated. This is a particular advantage for smaller systems, where the extent of the network may not justify the cost of a host with software systems that include configuration tools.

The configuration device can make use of previously created solutions to configure one or more networks with that same solution. This can be particularly attractive for smaller systems that may be designed for specific types of installations where standardization of the system design is possible.

With the use of a configuration device, field device installers do not need to be aware of the details of the configuration. Instead, the installers merely need to install devices in a specified order or install the devices with preconfigured device tags. ACD 20 can indicate when the configuration is complete. ACD 20 can be used to configure a network of devices, or even a single device.

The use of a configuration device also greatly simplifies device replacement. In one case, ACD 20 can permanently reside on network 10 to provide maintenance. When a device is removed from network 10, ACD 20 notes the change. If the original device returns, no action is taken, because that device is assumed to have restarted. If a new device of the same device type is detected, ACD 20 will configure that device by transferring the configuration or that device type from the network configuration domain of ACD 20 to the configuration domain of the replacement device. The technician replacing the field device only needs to know how to replace the device. The technician is not required to have knowledge of the Foundation Fieldbus protocol or the internal structure of the software or memory of the field device.

Although the present invention has been described with reference to preferred embodiments, workers skilled in the art will recognize that changes may be made in form and detail without departing from the spirit and scope of the invention.

The invention claimed is:

1. A method of installing and configuring field devices on an industrial process control network, the method comprising:

configuring the field devices with a configuration tool, wherein the configuration tool provides configuration data to each of the field devices through a sequence of messages, each message including individual configuration parameters for one of the field devices, the configuration data used to configure various function blocks and transducer blocks of each of the field devices, wherein configuration data received through the sequence of messages is stored in a configuration domain of the field device as a block of configuration data;

connecting an automatic configuration device (ACD) to the network;

removing the configuration tool from the network;

uploading to the ACD from each of the plurality of field devices the block of configuration data stored in the configuration domain of each field device, representing an entire configuration for each field device;

storing the blocks of configuration data uploaded from each of the field devices in a network configuration domain of the ACD; and downloading from the ACD to a new field device on the network one of the stored configurations if the new device is of a same field device type as one of the plurality of field device configurations stored by the ACD.

2. The method of claim 1 and further comprising:

storing at least one block of configuration data in each field device in a configuration domain of nonvolatile memory.

3. The method of claim 2, wherein uploading to the ACD comprises uploading the block of configuration data stored in the configuration domain of the field device to the network configuration domain of the configuration device.

4. The method of claim 1 and further comprising:
connecting the ACD to a second industrial process control network; and
configuring field devices connected on the second process control network based on blocks of configuration data stored in the configuration domain without requiring a configuration tool.

5. A method of configuring field devices on an industrial process control network, the method comprising:
creating a reference solution for the industrial process control network by configuring a plurality of reference field devices connected on a reference solution network using a configuration tool that provides a sequence of configuration messages to the reference field devices, each message containing configuration information for the various function blocks and transducer blocks associated with the reference field devices;
removing the configuration tool from the reference solution network;
connecting an automatic configuration device (ACD) to the reference solution network and uploading blocks of configuration data to the (ACD) from each of the plurality of reference field devices, each block of configuration data representing an entire configuration for each field device;
storing the uploaded blocks of configuration data to a network configuration domain of the ACD;
connecting an ACD with stored blocks of configuration data to the industrial process control network; and
downloading from the ACD to each of the plurality of field devices connected to the network one of the stored blocks of configuration data to automatically configure the field devices without requiring use of the configuration tool.

6. The method of claim 5 and further comprising:
generating a configuration file based on the configuration data stored in the network configuration domain of the ACD connected to the reference solution network; and
communicating the generated configuration file to the ACD connected to the industrial process control network.

7. The method of claim 5, wherein the same ACD that is connected to the reference solution network is disconnected from the reference solution network, and connected to the industrial process control network.

* * * * *